United States Patent
Moon et al.

(10) Patent No.: US 8,614,015 B2
(45) Date of Patent: Dec. 24, 2013

(54) SECONDARY BATTERY AND METHOD OF MANUFACTURING SECONDARY BATTERY

(75) Inventors: Jongseok Moon, Suwon-si (KR);
Seokyoon Yoo, Suwon-si (KR);
Chiyoung Lee, Suwon-si (KR);
Dongwook Kim, Suwon-si (KR);
Yoontai Kwak, Suwon-si (KR); Sangin Park, Suwon-si (KR)

(73) Assignees: Samsung SDI Co., Ltd., Yongin-Si, Gyeonggi-do (KR); Robert Bosch GmbH, Stuttgart (DE)

( * ) Notice: Subject to any disclaimer, the term of this patent is extended or adjusted under 35 U.S.C. 154(b) by 444 days.

(21) Appl. No.: 12/926,332

(22) Filed: Nov. 10, 2010

(65) Prior Publication Data
US 2011/0183171 A1    Jul. 28, 2011

(30) Foreign Application Priority Data

Jan. 27, 2010   (KR) .......................... 10-2010-0007464

(51) Int. Cl.
| | |
|---|---|
| *H01M 10/02* | (2006.01) |
| *H01M 10/04* | (2006.01) |
| *H01M 2/02* | (2006.01) |
| *H01M 4/64* | (2006.01) |

(52) U.S. Cl.
USPC ........................................................ 429/94

(58) Field of Classification Search
USPC ........... 429/94, 144, 326, 162, 251, 233, 178, 429/176; 29/623.1, 879
See application file for complete search history.

(56) References Cited

U.S. PATENT DOCUMENTS

| | | | |
|---|---|---|---|
| 2008/0070111 A1* | 3/2008 | Abe et al. ...................... | 429/163 |
| 2009/0092889 A1* | 4/2009 | Hwang et al. .................. | 429/94 |

FOREIGN PATENT DOCUMENTS

| | | |
|---|---|---|
| JP | 2003-173765 A | 6/2003 |
| JP | 2004-111300 A | 4/2004 |
| JP | 2006-228551 A | 8/2006 |
| JP | 2007-335150 A | 12/2007 |

OTHER PUBLICATIONS

Machine Translation of: JP-2007/335150 A1, Mita, Y., Dec. 2007.*
Machine Translation of: JP-2006/228551 A1, Ueki, T., Aug. 2006.*
Korean Notice of Allowance in KR 10-2010-0007464, dated Jan. 19, 2012 (Moon, et al.).

* cited by examiner

*Primary Examiner* — Kenneth Douyette
(74) *Attorney, Agent, or Firm* — Lee & Morse, P.C.

(57) ABSTRACT

A secondary battery includes first and second collecting plates branching out from an electrode terminal, and first and second electrode assemblies rolled up in a jelly-roll type unit, the first electrode assembly having a first non-coating portion adhered to the first collecting plate, the second electrode assembly having a second non-coating portion adhered to the second collecting plate, and the first and second collecting plates being on facing surfaces of respective first and second non-coating portions. The first non-coating portion is spaced apart from a roll center of the first electrode assembly by a first predetermined distance along a direction directed away from the second non-coating portion, and the second non-coating portion is spaced apart from a roll center of the second electrode assembly by a second predetermined distance along a direction directed away from the first non-coating portion.

19 Claims, 5 Drawing Sheets

SECONDARY BATTERY AND METHOD OF MANUFACTURING SECONDARY BATTERY

BACKGROUND

1. Field

Embodiments relate to a secondary battery and a method of manufacturing the secondary battery.

2. Description of the Related Art

Unlike a primary battery, i.e., a non-rechargeable battery, a secondary battery is a rechargeable and dischargeable battery. For example, a low capacity secondary battery may have a battery cell packaged in a form of a pack, and may be used for a small, portable electronic device, e.g., a mobile phone and a camcorder. In another example, a large capacity secondary battery may have tens of interconnected battery packs used as a power source for driving a motor of a hybrid electric vehicle and the like.

The secondary battery is formed in a variety of shapes, e.g., a prismatic shape, a cylindrical shape, and the like. The secondary battery includes an electrode assembly having positive and negative electrode plates and a separator between the positive and negative electrode plates, a case receiving the electrode assembly as well as an electrolyte, and a cap plate installed on the case.

SUMMARY

Embodiments are directed to a secondary battery and a method of manufacturing the secondary battery, which substantially overcome one or more of the problems due to the limitations and disadvantages of the related art.

It is therefore a feature of an embodiment to provide a secondary battery with at least two electrode assemblies in a single case, thereby increasing capacity of the secondary battery.

It is therefore another feature of an embodiment to provide a secondary battery having non-coating portions of respective at least two electrode assemblies in a same case and welded on corresponding collecting plates at a predetermined distance.

It is yet another feature of an embodiment to provide a method of manufacturing a secondary battery having one or more of the above features.

At least one of the above and other features and advantages may be realized by providing a secondary battery, including an electrode terminal, at least two collecting plates branching out from the electrode terminal, and at least two electrode assemblies respectively adhered to the at least two collecting plates and rolled up in a jelly-roll type, wherein the at least two collecting plates include a first collecting plate and a second collecting plate, the at least two electrode assemblies include a first electrode assembly having a first non-coating portion adhered to the first collecting plate and a second electrode assembly having a second non-coating portion adhered to the second collecting plate, the first collecting plate being provided on a surface of the first non-coating portion, which faces the second non-coating portion, the second collecting plate being provided on a surface of the second non-coating portion, which faces the first non-coating portion, the first non-coating portion being spaced apart from a roll center of the first electrode assembly by a first predetermined distance in a direction directed away from the second non-coating portion, and the second non-coating portion being spaced apart from a roll center of the second electrode assembly by a second predetermined distance in a direction directed away from the first non-coating portion.

The first predetermined distance may be greater than a thickness of the first non-coating portion and smaller than a thickness of the first collecting plate, and the second predetermined distance may be greater than a thickness of the second non-coating portion and less than a thickness of the second collection plate.

Thicknesses of the first and second collecting plates may be substantially the same, and the first and second predetermined distances may be substantially the same.

Each of the first and second predetermined distances may be about 1-2 mm.

A thickness of an ultrasonic welding support inserted between the first and second collecting plates may be about 6-8 mm, a distance between the roll center of the first electrode assembly and the roll center of the second electrode assembly may be about 9.5-10 mm, each thickness of the first and second non-coating portions may be about 0.2-0.4 mm, and each thickness of the first and second collecting plates may be about 1.9 mm.

The first and second electrode assemblies may be positioned in a same case.

A distance between the first and second non-coating portions may equal a sum of the first predetermined distance, the second predetermined distance, and a distance between the first and second roll centers.

A distance between facing surfaces of the first and second collecting plates may be larger than a width of an anvil.

The at least two collecting plates may further include third and fourth collecting plates, the at least two electrode assemblies may further include a third electrode assembly having a third non-coating portion adhered to the third collecting plate and a fourth electrode assembly having a fourth non-coating portion adhered to the fourth collecting plate, the third collecting plate may be provided on a surface of the third non-coating portion, which faces the fourth non-coating portion, the fourth collecting plate may be provided on a surface of the fourth non-coating portion, which faces the third non-coating portion, the third non-coating portion may be spaced apart from a roll center of the third electrode assembly by a third predetermined distance in a direction away from the fourth non-coating portion, and the fourth non-coating portion may be spaced apart from a roll center of the fourth electrode assembly by a fourth predetermined distance in a direction away from the third non-coating portion.

The third predetermined distance may be greater than a thickness of the third non-coating portion and less than a thickness of the third collecting plate, and the fourth predetermined distance may be greater than a thickness of the fourth non-coating portion and less than a thickness of the fourth collecting plate.

Each of the third and fourth predetermined distances may be about 1-2 mm.

A thickness of an ultrasonic welding support inserted between the third and fourth collecting plates may be about 6-8 mm, a distance between the roll center of the third electrode assembly and the roll center of the fourth electrode assembly may be about 9.5-10 mm, each thickness of the third and fourth non-coating portions may be about 0.2-0.4 mm, and each thickness of the third and fourth collecting plates may be about 1.9 mm.

Thicknesses of the first, second, third and fourth collecting plates may be same as each other and the first, second, third and fourth predetermined distances may be same as each other.

At least one of the above and other features and advantages may also be realized by providing a method of manufacturing a secondary battery, the method including forming first and second collecting plates to branch out from an electrode terminal, and forming first and second electrode assemblies rolled up in a jelly-roll type unit, such that the first electrode assembly has a first non-coating portion adhered to the first collecting plate, the second electrode assembly has a second non-coating portion adhered to the second collecting plate, and the first and second collecting plates are on facing surfaces of respective first and second non-coating portions, wherein the first non-coating portion is formed to be spaced apart from a roll center of the first electrode assembly by a first predetermined distance along a direction directed away from the second non-coating portion, and wherein the second non-coating portion is formed to be spaced apart from a roll center of the second electrode assembly by a second predetermined distance along a direction directed away from the first non-coating portion.

The method may further include stacking the first and second electrode assemblies on one another, inserting the first and second collecting plates between the first and second non-coating portions, inserting an ultrasonic welding support between the first and second collecting plates, and welding the first non-coating portion and the first collecting plate by positioning an ultrasonic welding rod corresponding to the ultrasonic welding support on the first non-coating portion.

The first and second predetermined distances may be adjusted to define a distance between the first and second collecting plates that is greater than a width of the ultrasonic welding support.

The first non-coating portion may be spaced apart from the roll center of the first electrode assembly in a direction away from the second non-coating portion and the second non-coating portion may be spaced apart from the roll center of the second electrode assembly in a direction away from the first non-coating portion.

The first predetermined distance may be greater than a thickness of the first non-coating portion and less than a thickness of the first collecting plate and the second predetermined distance may be greater than a thickness of the second non-coating portion and less than a thickness of the second collection plate.

Thicknesses of the first and second collecting plates may be same as each other and the first and second predetermined distances may be same as each other.

Each of the first and second predetermined distance is about 1-2 mm.

A thickness of an ultrasonic welding support inserted between the first and second collecting plates may be about 6-8 mm, a distance between the roll center of the first electrode assembly and the roll center of the second electrode assembly may be about 9.5-10 mm, each thickness of the first and second non-coating portions may be about 0.2-0.4 mm, and each thickness of the first and second collecting plates may be about 1.9 mm.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0007464, filed on Jan. 27, 2010, in the Korean Intellectual Property Office, and entitled: "Secondary Battery and Method of Manufacturing Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
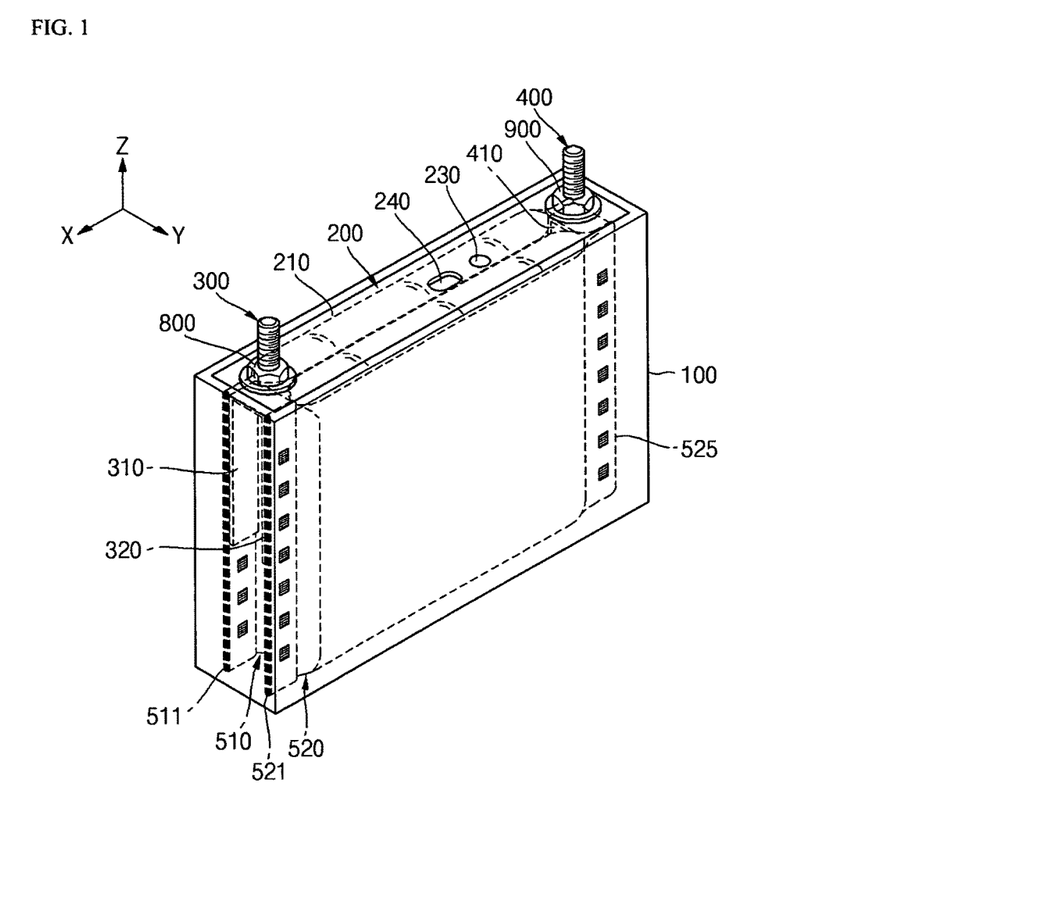
FIG. 1 illustrates a perspective view of a secondary battery according to an embodiment.
Figure 3:
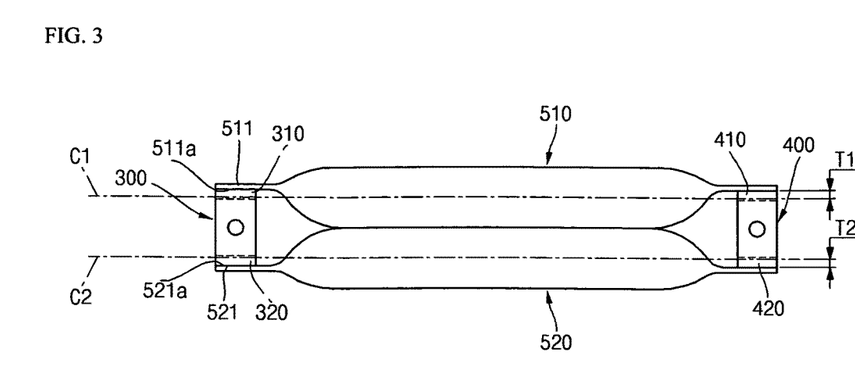
FIG. 3 illustrates a top plan view of the electrode assembly of FIG. 2.
Figure 4:
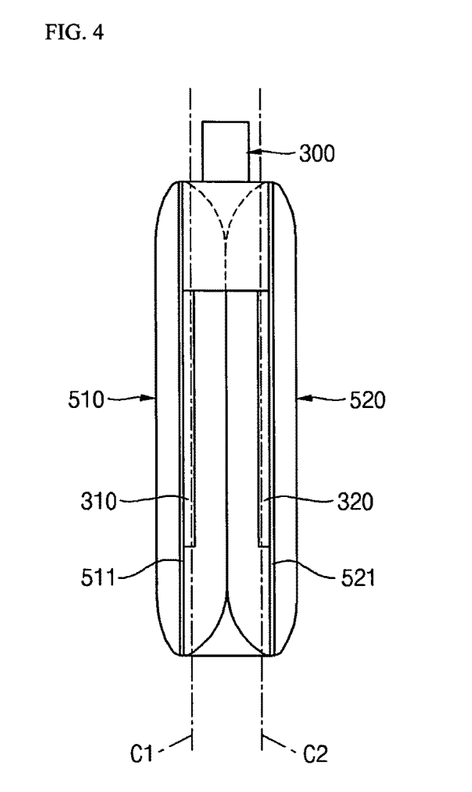
FIG. 4 illustrates a side view of the electrode assembly of FIG. 2.

A secondary battery according to an embodiment will be described hereinafter with reference to FIGS. 1-4. FIG. 1 illustrates a perspective view of a secondary battery according to an embodiment, FIG. 2 illustrates a partial perspective view of an electrode assembly in the secondary battery of FIG. 1, FIG. 3 illustrates a top plan view of the electrode assembly of FIG. 2 from point "A," and FIG. 4 illustrates a side view of the electrode assembly of FIG. 2 from point "B."

Figure 2:
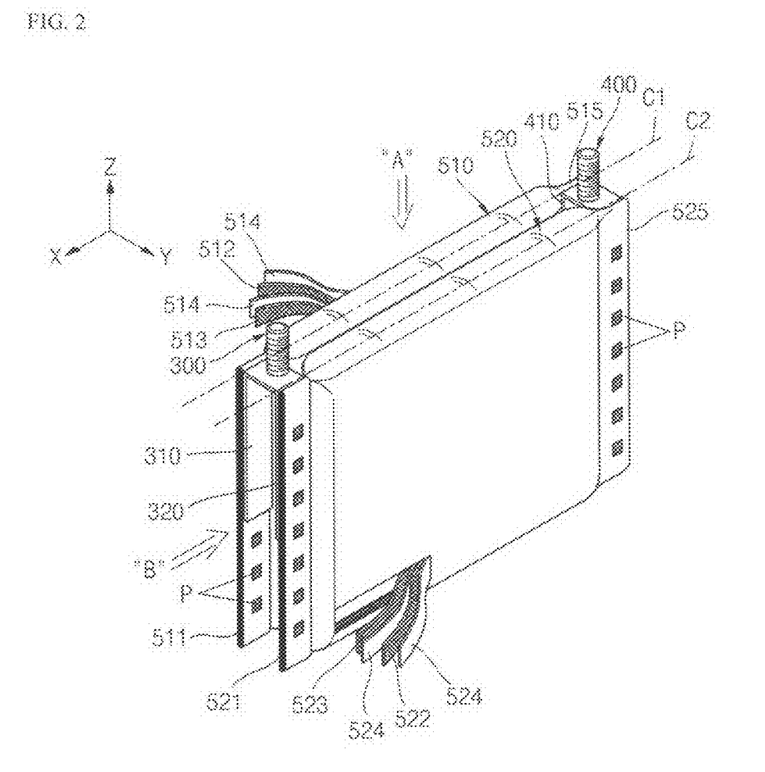
FIG. 2 illustrates a partial perspective view of an electrode assembly of the secondary battery in FIG. 1.

Referring to FIGS. 1 and 2, a secondary battery according to an embodiment may include a case 100, a cap assembly 200, a first electrode terminal 300 from which first and second collecting plates 310 and 320 branch out, a second electrode terminal 400 from which third and fourth collecting plates 410 and 420 branch out, and first and second electrode assemblies 510 and 520.

The case 100 may be formed of a conductive metal, e.g., aluminum, aluminum alloy, etc., and may be steel-plated with nickel. The case 100 may have any suitable shape, e.g., a prismatic shape, and may include an opening (not shown) for receiving the first and second electrode assemblies 510 and 520, the first electrode terminal 300, the second electrode terminal 400, and an electrolyte (not shown). In FIG. 1, since the case 100 and the cap assembly 200 are coupled to each other, the opening is not shown. It is noted, however, that the opening in the case 100 may be along a circumferential portion of the cap assembly 200. An inner surface of the case 100 may be processed to be insulated from the first and second electrode assemblies 510 and 520 and the first and second electrode terminals 300 and 400.

The cap assembly 200 may be coupled to the case 100. The cap assembly 200 may include a cap plate 210. The cap plate 210 may seal the opening of the case 100, and may be formed of a same material as the case 100. In addition, the cap plate 210 may include a plug 230 for sealing an electrolyte injection hole and a safety vent 240 that is relatively thin. The first and second electrode terminals 300 and 400 may be exposed through the cap plate 210.

The first and second collecting plates 310 and 320 may branch out from the first electrode terminal 300. The first electrode terminal 300 may be formed of a conductive material, e.g., aluminum.

The first collecting plate 310 may be welded on a first positive electrode non-coating portion 511 of the first electrode assembly 510, i.e., on a portion protruding toward a first end portion of the first electrode assembly 510, and thus, may be electrically connected to a first positive electrode plate 512 of the first electrode assembly 510. The second collecting plate 320 may be welded on a second positive electrode non-coating portion 521 of the second electrode assembly 520, i.e., on a portion protruding toward a first end portion of the second electrode assembly 520, and thus, may be electrically connected to a second positive electrode plate 522 of the second electrode assembly 520.

The third and fourth collecting plates 410 and 420 may extend from the second electrode terminal 400. The second electrode terminal 400 may be formed of a conductive material, e.g., nickel.

The third collecting plate 410 may be welded on a first negative electrode non-coating portion 515 of the first electrode assembly 510, i.e., on a portion protruding toward a second end opposite the first end of the first electrode assembly 510, and thus, may be electrically connected to the first negative electrode plate 513 of the first electrode assembly 510. The fourth collecting plate 420 may be welded on a second negative electrode non-coating portion 525 of the second electrode assembly 520, i.e., on a portion protruding toward the second end opposite the first end of the second electrode assembly 520, and thus, may be electrically connected to the second negative electrode plate 523 of the second electrode assembly 520.

A first nut 800 may be coupled to the first electrode terminal 300. A second nut 900 may be coupled to the second electrode terminal 400.

As illustrated in FIG. 2, the first electrode assembly 510 may include the first positive electrode plate 512, e.g., formed in a thin plate shape or a thin film shape, a first separator 514, and the first negative electrode plate 513, which may be stacked on one another and rolled up in a jelly-roll type unit. The separator 514 may separate the first positive and negative electrode plates 512 and 513.

The first positive electrode plate 512 may be formed by applying a positive electrode active material, e.g., a transition metal oxide, on a positive electrode collector, e.g., a metal foil such as an aluminum foil. Therefore, the first positive electrode plate 512 may include a coated portion and the first positive electrode non-coating portion 511, i.e., a portion on which no positive electrode active material is applied. The first positive electrode non-coating portion 511 may extend along a longitudinal direction of the first electrode assembly 510 toward an edge of the case 100. The first positive electrode non-coating portion 511 may function as a passageway along which a current flows between the first positive electrode plate 512 and the first collecting plate 310 of the first electrode terminal 300. It is noted that a material of the first positive electrode plate 512 is not limited to the above materials.

The first negative electrode plate 513 may be formed by applying a negative electrode active material, e.g., graphite or carbon, on a negative electrode collector, e.g., formed of a metal foil such as a nickel or copper foil. Therefore, the first negative electrode plate 513 may include a coated portion and the first negative electrode non-coating portion 515, i.e., a portion on which no negative electrode active material is applied. The first negative electrode non-coating portion 515 may extend along a longitudinal direction of the first electrode assembly 510 toward an edge of the case 100, such that the first positive and negative electrode non-coating portions 511 and 515 extend in opposite directions. The first negative electrode non-coating portion 515 may function as a passageway along which a current flows between the first negative electrode plate 513 and the third collecting plate 410 of the second electrode terminal 400. It is noted that a material of the first negative electrode plate 513 is not limited to the above materials.

The first separator 514 may be disposed between the first positive electrode plate 512 and the first negative electrode plate 513 to prevent a short circuit, while allowing movement of lithium ions. The first separator 514 may be formed of, e.g., polyethylene, polypropylene, or a combination thereof. However, a material of the first separator 514 is not limited to the above materials.

As illustrated in FIG. 2, the second electrode assembly 520 may include the second positive electrode plate 522, e.g., formed in a thin plate or thin film shape, a second separator 524, and the second negative electrode plate 523, which are stacked one another and rolled up in a jelly-roll type unit. The second separator 524 may separate the second positive and negative electrode plates 522 and 523.

The second positive electrode plate 522 may be formed by applying a positive electrode active material, e.g., a transition metal oxide, on the positive electrode collector, e.g., formed of a metal foil such as an aluminum foil. The second positive electrode plate 522 may include the second positive electrode non-coating portion 521, i.e., on which no positive electrode active material is applied. The second positive electrode non-coating portion 521 may extend along a longitudinal direction of the second electrode assembly 520 toward an edge of the case 100. The second positive electrode non-coating portion 521 may function as a passageway along which a current flows between the second positive electrode plate 522 and the second collecting plate 320 of the first electrode terminal 300. It is noted that a material of the second positive electrode plate 522 is not limited to the above materials. The first and second positive electrode non-coating portions 511 and 521 may extended in a same direction and face each other.

The second negative electrode plate 523 may be formed by applying a negative electrode active material, e.g., such as graphite or carbon, on a negative electrode collector, e.g., formed of a metal foil such as a nickel or copper foil. The second negative electrode plate 523 may include the second negative electrode non-coating portion 525, i.e., on which no negative electrode active material is applied. The second negative electrode non-coating portion 525 may extend along a longitudinal direction of the second electrode assembly 520 toward an edge of the case 100, such that the second positive and negative electrode non-coating portions 521 and 525 extend in opposite directions. The second negative electrode non-coating portion 525 may function as a passageway along which a current flows between the second negative electrode plate 523 and the fourth collecting plate 420 of the second electrode terminal 400. The first and second negative electrode non-coating portions 515 and 525 may extended in a same direction and face each other. It is noted that a material of the second negative electrode plate 523 is not limited to the above materials.

The second separator 524 may be disposed between the second positive electrode plate 522 and the second negative electrode plate 523 to prevent a short circuit while allowing movement of lithium ions. The second separator 524 may be formed of, e.g., polyethylene, polypropylene, or a combination thereof. However, a material of the second separator 524 is not limited to the above materials.

The first and second electrode assemblies 510 and 520 together with the electrolyte (not shown) may be accommodated in the case 100. The electrolyte may include an organic solvent, e.g., ethylene carbonate (EC), polycarbonate (PC), diethyl carbonate (DEC), ethyl methyl carbonate (EMC), and/or dimethyl carbonate (DMC), and a lithium salt, e.g., $LiPF_6$ and/or $LiBF_4$. The electrolyte may be in a liquid phase, a solid phase, or a gel phase.

The first and second electrode terminals 300 and 400 may be formed in an identical shape. The first positive electrode non-coating portion 511 and the first negative electrode non-coating portion 515 may also be formed in an identical shape. The second positive electrode non-coating portion 521 and the second negative electrode non-coating portion 525 may also be formed in an identical shape. Therefore, the following description will be based on the first electrode terminal 300, the first positive electrode non-coating portion 511, and the second positive electrode non-coating portion 521. For simplicity, hereinafter, "first electrode terminal 300" and "electrode terminal 300" are used interchangeably, "first positive electrode non-coating portion 511" and "first non-coating portion 511" are used interchangeably, and "second positive electrode non-coating portion 521" and "second non-coating portion 521" are used interchangeably.

Figure 5:
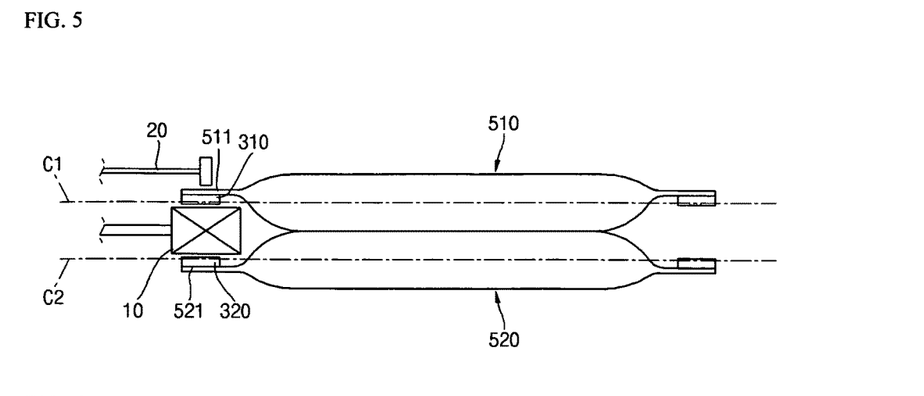
FIG. 5 illustrates a cross-sectional view of a process for welding a first non-coating portion on a first collecting plate using an ultrasonic welding rod and an ultrasonic welding support according to an embodiment.

The following will describe the secondary battery in more detail with reference to FIGS. 3 to 5. FIG. 3 illustrates a top plan view of the first and second electrode assemblies 510 and 520 as viewed from point "A" in FIG. 2, FIG. 4 illustrates a side view of the first and second electrode assemblies 510 and 520 as viewed from point "B" in FIG. 2, and FIG. 5 illustrates a cross-sectional view of a process for welding the first positive electrode non-coating portion 511 on the first collecting plate 310 using an ultrasonic welding rod and an ultrasonic welding support according to an embodiment.

As illustrated in FIGS. 3 and 4, the first collecting plate 310 of the electrode terminal 300 may be disposed on an inner surface 511a of the first non-coating portion 511, i.e., a surface facing the second non-coating portion 521. The second collecting plate 320 of the electrode terminal 300 may be disposed on an inner surface 521a of the second non-coating portion 521, i.e., a surface facing the first non-coating portion 511. As further illustrated in FIG. 3, the first non-coating portion 511 may be spaced apart from a first rolling center C1 of the first electrode assembly 510, i.e., a center of the jelly-roll shape of the first electrode assembly 510, by a first predetermined distance T1. The second non-coating portion 521 may be spaced apart from a second roll center C2 of the second electrode assembly 520, i.e., a center of the jelly-roll shape of the first electrode assembly 510, by a second predetermined distance T2. Further, the first non-coating portion 511 may be spaced directed away from the first roll center C1 of the first electrode assembly 510 in a direction directed away from the second non-coating portion 521. Similarly, the second non-coating portion 521 may be spaced apart from the second roll center C2 of the second electrode assembly 520 in a direction away from the first non-coating portion 511.

In other words, the first and second non-coating portions 511 and 521 may be spaced apart from respective first and second roll centers C1 and C2 in opposite directions relative to each other. That is, if a distance between the first and second roll centers C1 and C2 equals roll distance CS, a distance between the first and second non-coating portions 511 and 521 may equal a sum of the roll distance CS, the first predetermined distance T1, and the second predetermined distance T2. It is noted that a distance between the first non-coating portion 511 to another non-coating portion or to a roll center refers to a distance measured from the inner surface 511a along a normal to the inner surface 511a, e.g., along the y-axis in FIG. 1. Similarly, a distance between the second non-coating portion 521 to another non-coating portion or to a roll center refers to a distance measured from the inner surface 521a along a normal to the inner surface 521a.

Accordingly, since the first and second non-coating portions 511 and 521 are spaced apart from respective roll centers in opposite directions from each other by respective first and second predetermined distances T1 and T2, a gap between the first and second collecting plates 310 and 320 may be correspondingly increased. In other words, as the first and second collecting plates 310 and 320 are positioned on respective first and second non-coating portions 511 and 521 to face each other, an increased gap between the first and second non-coating portions 511 and 521 may increase a gap between the first and second collecting plates 310 and 320. As such, the first and second predetermined distances T1 and T2 may be adjusted to provide a sufficient distance between the first and second collecting plates 310 and 320 for welding equipment, thereby minimizing damage to the first and second collecting plates 310 and 320.

For example, as illustrated in FIG. 5, the first and second predetermined distances T1 and T2 may be adjusted to provide a sufficient distance for inserting an ultrasonic welding support 10, e.g., an anvil, between the first and second collecting plates 310 and 320. That is, when the ultrasonic welding support 10 is inserted between the first and second collecting plates 310 and 320 to weld the first non-coating portion 511 and the first collecting plate 310 to each other, the insertion of the ultrasonic welding support 10 may be easily done, thereby reducing manufacturing time and costs. Furthermore, damage to the first and second collecting plates 310 and 320, e.g., caused by the insertion of the ultrasonic welding support 10, may be minimized when the distance between the first and second collecting plates 310 and 320 is increased.

The first predetermined distance T1 may be greater than a thickness, i.e., a distance along the y-axis in FIG. 1, of the first non-coating portion 511 but smaller than a thickness of the first collecting plate 310. That is, since the thicknesses of the first and second collecting plates 310 and 320 and the thicknesses of the first and second non-coating portions 511 and 521 vary depending on the capacity of the battery, the first and second predetermined distances T1 and T2 may be set to be relative to each other. When the first predetermined distance T1 is smaller than the thickness of the first non-coating portion 511, the insertion time of the ultrasonic welding support 10 may be increased. When the first predetermined distance T1 is greater than the thickness of the first collecting plate 310, the welding may be done poorly. In addition, when the first collecting plate 310 has the same thickness as the second collecting plate 320, the first predetermined distance T1 may be substantially the same as the second predetermined distance T2.

For example, when the thickness of the ultrasonic welding support 10 to be inserted between the first and second collecting plates 310 and 320 is about 6-8 mm, the distance between the first roll center C1 of the first electrode assembly 510 and the second roll center C2 of the second electrode assembly 520 is about 9.5-10 mm, each thickness of the first and second non-coating portions 511 and 521 is about 0.2-0.4 mm, and each the thickness of the first and second collecting plates 310 and 320 is about 1.9 mm, each of the first and second predetermined distances T1 and T2 may be about 1 mm to about 2 mm. Further, when each of the first and second predetermined distances T1 and T2 is less than 1 mm, the insertion time of the ultrasonic welding support 10 is almost the same as the conventional insertion time. It is noted that when each of the first and second predetermined distances T1 and T2 is greater than 2 mm, the gap between the first non-coating portion 511 and the first collecting plate 310 may be widened and the welding may be poorly done.

Figure 6:
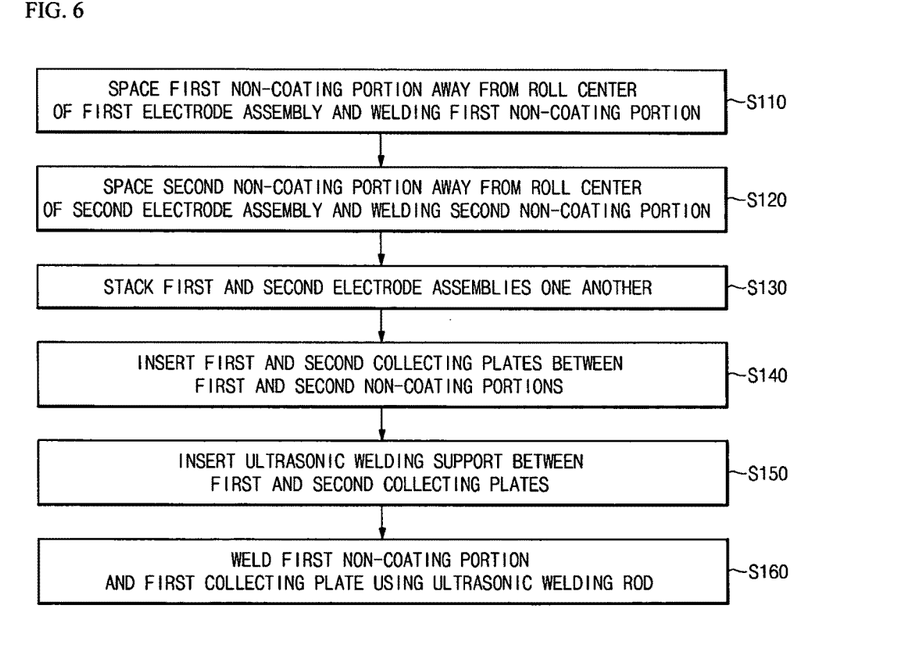
FIG. 6 illustrates a block diagram of a method of manufacturing a secondary battery according to an embodiment.

The following will describe a method of manufacturing the secondary battery according to an embodiment with reference to FIGS. 3 through 6. FIG. 6 illustrates a block diagram of a method of manufacturing a secondary battery according to an embodiment.

First, the first non-coating portion 511 of the first electrode assembly 510 may be folded and welded (see P in FIG. 2). As illustrated in FIG. 6, the first non-coating portion 511 may be folded and welded at a portion spaced apart from the first roll center C1 of the first electrode assembly 510 by the first predetermined distance T1 in operation S110. At the same time, the second non-coating portion 521 may be folded and welded at a portion spaced apart from the second roll center C2 of the second electrode assembly 520 in operation S120. At this point, the first non-coating portion 511 may be spaced apart from the first roll center C1 of the first electrode assembly 510 in a direction directed away from the second non-coating portion 521. The second non-coating portion 521 may be spaced apart from the second roll center C2 of the second electrode assembly 520 in a direction directed way from the first non-coating portion 511.

Next, as illustrated in FIG. 3, the first and second electrode assemblies 510 and 520 may be stacked on one another, i.e., operation S130 in FIG. 6. In this state, as illustrated in FIGS. 3 and 4, the first and second collecting plates 310 and 320 branching out from the electrode terminal 300 may be inserted between the first and second non-coating portions 511 and 521, i.e., operation S140 in FIG. 6.

Next, as illustrated in FIG. 5, the ultrasonic welding support 10 may be positioned between the first and second collecting plates 310 and 320, i.e., operation S150 in FIG. 6. Once the ultrasonic welding support 10 is set, as illustrated in FIG. 5, an ultrasonic welding rod 20, e.g., a horn, corresponding to the ultrasonic welding support 10 may be positioned at the first non-coating portion 511 to weld the first collecting plate 310 and the first non-coating portion 511, i.e., operation 5160 in FIG. 6. Generally, the horn may have a lower thickness than the Anvil.

In order to weld the second non-coating portion 521 and the second collecting plate 320, the first and second electrode assemblies 510 and 520 stacked on one another may be turned upside-down, and the ultrasonic welding rod 20 may be positioned at the second non-coating portion 521. When turning the first and second electrode assemblies 510 and 520 upside-down, the ultrasonic welding support 10 may rotate while being inserted therebetween.

Figure 7:
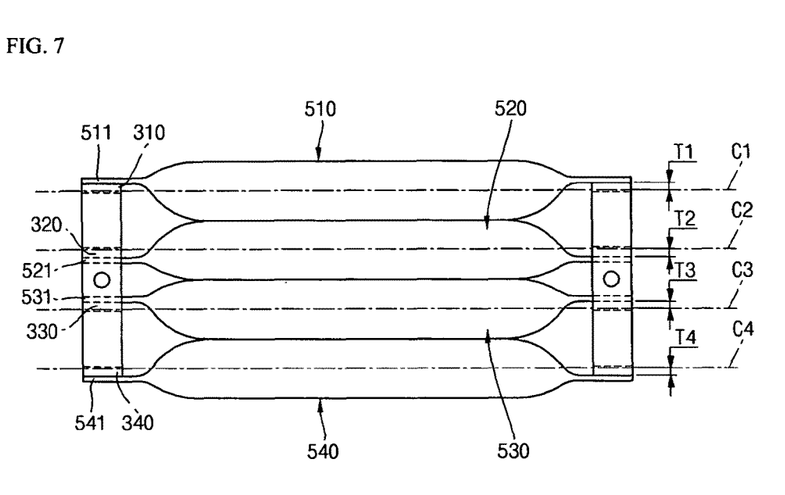
FIG. 7 illustrates a top-plan view of an electrode assembly of a secondary battery according to another embodiment.
Figure 8:
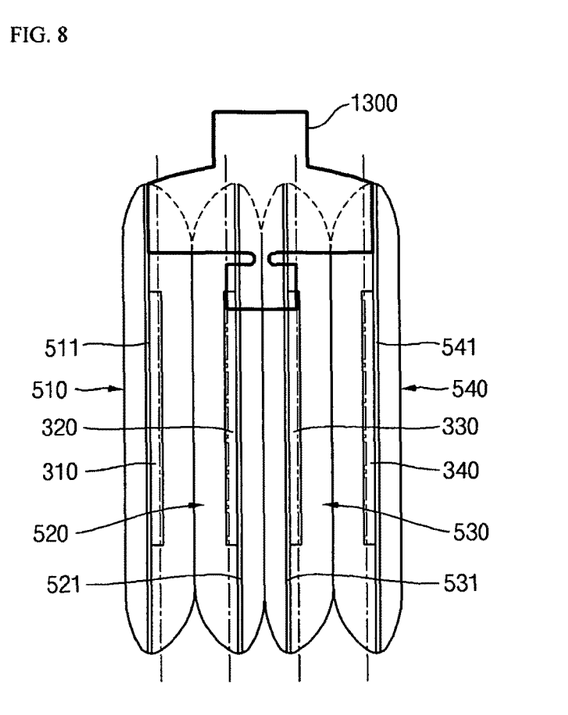
FIG. 8 illustrates a side view of the electrode assembly in FIG. 7.

The following will describe a secondary battery according to another embodiment with reference to FIGS. 7 and 8. FIG. 7 illustrates a top plan view of an electrode assembly of a secondary battery according to another embodiment, and FIG. 8 illustrates a side view of the electrode assembly of FIG. 7.

Referring to FIGS. 7-8, a secondary battery may be substantially the same as the secondary battery described previously with reference to FIGS. 1-6, with the exception of including additional electrode assemblies. That is, the secondary battery may include a third collecting plate 330, a fourth collecting plate 340, a third electrode assembly 530 having a third non-coating portion 531, and a fourth electrode assembly 540 having a fourth non-coating portion 541.

The third collecting plate 330 may be provided on a surface of the third non-coating portion 531, which faces the fourth non-coating portion 541. The fourth collecting plate 340 may be provided on a surface of the fourth non-coating portion 541, which faces the third non-coating portion 531. The third non-coating portion 531 may be spaced apart from a third roll center C3 of the third electrode assembly 540 by a third predetermined distance T3. The fourth non-coating portion 541 may be spaced apart from a fourth roll center C4 of the fourth electrode assembly 550 by a fourth predetermined distance T4. In detail, the third and fourth non-coating portions 531 and 541 may be spaced apart in a direction directed away from each other, i.e., in opposing directions. The second non-coating portion 521 may be spaced apart from the second roll center C2 of the second electrode assembly 520 in a direction directed away from the first non-coating portion 511.

The third and fourth collecting plates 330 and 340 together with the first and second collecting plates 310 and 320 may branch out from an electrode terminal 1300, as illustrated in FIG. 8.

The third predetermined distance T3 may be greater than a thickness of the third non-coating portion 531 and smaller than a thickness of the third collecting plate 330. The fourth predetermined distance T4 may be greater than a thickness of the fourth non-coating portion 541 and smaller than a thickness of the fourth collecting plate 340.

When the thickness of the ultrasonic welding support 10 to be inserted between the third and fourth collecting plates 330 and 340 is about 6-8 mm, the distance between the third roll center C3 of the third electrode assembly 530 and the fourth roll center C4 of the fourth electrode assembly 540 is about 9.5-10 mm, each of the thicknesses of the third and fourth non-coating portions 531 and 541 is about 0.2-0.4 mm, and each of the thicknesses of the third and fourth collecting plates 330 and 340 is about 1.9 mm, each of the third and fourth predetermined distances T3 and T4 may be about 1-2 mm. In addition, when the first, second, third, and fourth collecting plates 310, 320, 330, 340 have the same thickness, the first, second, third, and fourth predetermined distances T1, T2, T3, and T4 may be the same. Since the description of the third and fourth predetermined distances T3 and T4 is the same as that of the first and second predetermined distances T1 and T2, further description of the third and fourth predetermined distances T3 and T4 will not be repeated.

As described previously, a secondary battery according to embodiments may include at least two electrode assemblies 510 and 520 in one case 100, thereby increasing capacity of the battery. In addition, since the first and second non-coating portions 511 and 521 are spaced apart from the roll centers C1 and C2 of the first and second electrode assemblies 510 and 520 in a direction directed away from each other, the ultrasonic welding support 10, e.g., an anvil having a minimum threshold thickness of about 8 mm, may be easily inserted between the first and second collecting plates 310 and 320 branching out from the electrode terminal 300, thereby reducing manufacturing time. Furthermore, since the ultrasonic welding support 10 can be smoothly inserted, damage to the first and second collecting plates 310 and 320 may be prevented or substantially minimized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode terminal;
   first and second collecting plates branching out from the electrode terminal; and
   first and second electrode assemblies rolled up in a jelly-roll type unit, the first electrode assembly having a first non-coating portion adhered to the first collecting plate, the second electrode assembly having a second non-coating portion adhered to the second collecting plate, the first and second collecting plates being on facing surfaces of respective first and second non-coating portions,
   wherein the first non-coating portion is spaced apart from a roll center of the first electrode assembly by a first predetermined distance along a direction directed away from the second non-coating portion,
   wherein the second non-coating portion is spaced apart from a roll center of the second electrode assembly by a second predetermined distance along a direction directed away from the first non-coating portion, and
   wherein an entire first non-coating portion of the first electrode assembly is adhered to the first collecting plate, an entire second non-coating portion of the second electrode assembly is adhered to the second collecting plate, and the first and second non-coating portions being connected only via the electrode terminal.

2. The secondary battery as claimed in claim 1, wherein:
   the first predetermined distance is greater than a thickness of the first non-coating portion and smaller than a thickness of the first collecting plate; and
   the second predetermined distance is greater than a thickness of the second non-coating portion and smaller than a thickness of the second collection plate.

3. The secondary battery as claimed in claim 1, wherein thicknesses of the first and second collecting plates are substantially the same, and the first and second predetermined distances are substantially the same.

4. The secondary battery as claimed in claim 1, wherein each of the first and second predetermined distances is about 1 mm to about 2 mm.

5. The secondary battery as claimed in claim 4, wherein a distance between the first and second collecting plates is about 6-8 mm, a distance between the roll center of the first electrode assembly and the roll center of the second electrode assembly is about 9.5-10 mm, each thickness of the first and second non-coating portions is about 0.2-0.4 mm, and each thickness of the first and second collecting plates is about 1.9 mm.

6. The secondary battery as claimed in claim 1, wherein the first and second electrode assemblies are positioned in a same case, and the respective first and second collecting plates extend in parallel to each other.

7. The secondary battery as claimed in claim 1, wherein a distance between the first and second non-coating portions equals a sum of the first predetermined distance, the second predetermined distance, and a distance between the first and second roll centers.

8. The secondary battery as claimed in claim 1, further comprising:
   third and fourth collecting plates branching out from the electrode terminal;
   a third electrode assembly on the second electrode assembly and having a third non-coating portion adhered to the third collecting plate; and
   a fourth electrode assembly having a fourth non-coating portion adhered to the fourth collecting plate, the third and fourth collecting plates being on facing surfaces of respective third and fourth non-coating portions,
   wherein the third non-coating portion is spaced apart from a roll center of the third electrode assembly by a third predetermined distance along a direction directed away from the fourth non-coating portion, and
   the fourth non-coating portion is spaced apart from a roll center of the fourth electrode assembly by a fourth predetermined distance along a direction directed away from the third non-coating portion.

9. The secondary battery as claimed in claim 8, wherein:
   the third predetermined distance is greater than a thickness of the third non-coating portion and smaller than a thickness of the third collecting plate, and
   the fourth predetermined distance is greater than a thickness of the fourth non-coating portion and smaller than a thickness of the fourth collecting plate.

10. The secondary battery as claimed in claim 8, wherein each of the third and fourth predetermined distances is about 1 mm to about 2 mm.

11. The secondary battery as claimed in claim 10, wherein a distance between the third and fourth collecting plates is about 6-8 mm, a distance between the roll center of the third electrode assembly and the roll center of the fourth electrode assembly is about 9.5-10 mm, each thickness of the third and fourth non-coating portions is about 0.2-0.4 mm, and each thickness of the third and fourth collecting plates is about 1.9 mm.

12. The secondary battery as claimed in claim 8, wherein thicknesses of the first, second, third, and fourth collecting plates are substantially the same, and the first, second, third, and fourth predetermined distances are substantially the same.

13. A method of manufacturing a secondary battery, the method comprising:
   forming first and second collecting plates to branch out from an electrode terminal; and
   forming first and second electrode assemblies rolled up in a jelly-roll type, such that the first electrode assembly has a first non-coating portion adhered to the first collecting plate, the second electrode assembly has a second non-coating portion adhered to the second collecting plate, and the first and second collecting plates are on facing surfaces of respective first and second non-coating portions,
   wherein the first non-coating portion is formed to be spaced apart from a roll center of the first electrode assembly by a first predetermined distance along a direction directed away from the second non-coating portion, and
   wherein the second non-coating portion is formed to be spaced apart from a roll center of the second electrode assembly by a second predetermined distance along a direction directed away from the first non-coating portion, wherein an entire first non-coating portion of the first electrode assembly is adhered to the first collecting plate, an entire second non-coating portion of the second electrode assembly is adhered to the second collecting plate, and the first and second non-coating portions being connected only via the electrode terminal.

14. The method as claimed in claim 13, further comprising:
stacking the first and second electrode assemblies on one another;
inserting the first and second collecting plates between the first and second non-coating portions;
inserting an ultrasonic welding support between the first and second collecting plates; and
welding the first non-coating portion and the first collecting plate by positioning an ultrasonic welding rod corresponding to the ultrasonic welding support on the first non-coating portion.

15. The method as claimed in claim 14, wherein the first and second predetermined distances are adjusted to define a distance between the first and second collecting plates that is greater than a width of the ultrasonic welding support.

16. The method as claimed in claim 13, wherein:
the first predetermined distance is formed to be greater than a thickness of the first non-coating portion and smaller than a thickness of the first collecting plate, and
the second predetermined distance is formed to be greater than a thickness of the second non-coating portion and smaller than a thickness of the second collection plate.

17. The method as claimed in claim 13, wherein thicknesses of the first and second collecting plates are formed to be substantially the same, and the first and second predetermined distances are formed to be substantially the same.

18. The method as claimed in claim 13, wherein each of the first and second predetermined distance is formed to be about 1 mm to about 2 mm.

19. The method as claimed in claim 18, wherein a distance between the first and second collecting plates is formed to be about 6-8 mm, a distance between the roll center of the first electrode assembly and the roll center of the second electrode assembly is formed to be about 9.5-10 mm, each thickness of the first and second non-coating portions is formed to be about 0.2-0.4 mm, and each thickness of the first and second collecting plates is formed to be about 1.9 mm.

* * * * *